(12) United States Patent
Kotake

(10) Patent No.: US 11,113,804 B2
(45) Date of Patent: Sep. 7, 2021

(54) QUALITY ESTIMATION DEVICE, QUALITY ESTIMATION METHOD, AND QUALITY ESTIMATION PROGRAM

(71) Applicant: OMRON Corporation, Kyoto (JP)

(72) Inventor: Yasuyo Kotake, Kyoto (JP)

(73) Assignee: OMRON Corporation, Kyoto (JP)

( * ) Notice: Subject to any disclaimer, the term of this patent is extended or adjusted under 35 U.S.C. 154(b) by 108 days.

(21) Appl. No.: 16/572,664

(22) Filed: Sep. 17, 2019

(65) Prior Publication Data
US 2020/0098102 A1 Mar. 26, 2020

(30) Foreign Application Priority Data
Sep. 26, 2018 (JP) ................ JP2018-179773

(51) Int. Cl.
*G06T 7/00* (2017.01)
*G06T 7/70* (2017.01)

(52) U.S. Cl.
CPC .......... *G06T 7/0004* (2013.01); *G06T 7/70* (2017.01); *G06T 2207/30196* (2013.01); *G06T 2207/30204* (2013.01)

(58) Field of Classification Search
CPC ............ G06T 7/0004; G06T 7/70; G06T 2207/30196; G06T 2207/30204; Y02P 90/30; G06Q 50/04; G06Q 10/06395
See application file for complete search history.

(56) References Cited

U.S. PATENT DOCUMENTS

| 6,625,511 B1 | 9/2003 | Suzuki et al. | |
|---|---|---|---|
| 2016/0253618 A1* | 9/2016 | Imazawa | G06K 9/6296 705/7.15 |
| 2018/0130376 A1* | 5/2018 | Meess | A42B 3/30 |
| 2018/0259947 A1* | 9/2018 | Mioki | G05B 19/418 |

FOREIGN PATENT DOCUMENTS

| JP | 2006-073014 A | 3/2006 |
|---|---|---|
| JP | 2009-110239 A | 5/2009 |
| JP | 2009110239 A * | 5/2009 |

(Continued)

OTHER PUBLICATIONS

The extended European search report dated Feb. 25, 2020 in a counterpart European patent application.

*Primary Examiner* — Nizar N Sivji
(74) *Attorney, Agent, or Firm* — Metrolex IP Law Group, PLLC

(57) ABSTRACT

A quality estimation device includes: a first acquisition unit configured to acquire first information pertaining to the positioning of a worker executing a work step included in a process for manufacturing a product on a production line; a second acquisition unit configured to acquire second information pertaining to the usage condition of a tool the worker uses in the work step; an estimation unit configured to estimate the quality of a product being made through the work step according to the degree to which the positioning of the worker and the degree to which the usage condition of the tool represented by the acquired first information and the acquired second information conforms to a predetermined first standard and a predetermined second standard; and an output unit configured to output information pertaining to the result of estimating the quality of the product.

17 Claims, 5 Drawing Sheets

(56) References Cited

FOREIGN PATENT DOCUMENTS

| | | | | | |
|---|---|---|---|---|---|
| JP | 2013174980 | A | * | 9/2013 | ..... G06Q 10/063114 |
| JP | 2016-042332 | A | | 3/2016 | |
| JP | 2016042332 | A | * | 3/2016 | |
| JP | 2018-140432 | A | | 9/2018 | |
| JP | 2018140432 | A | * | 9/2018 | |

* cited by examiner

| Quality | First Class (%) | Second Class (%) | Third Class (%) | Fourth Class (%) |
|---|---|---|---|---|
| Score A | 9.52 | 1.23 | 0.56 | 0.46 |
| Score B | 4.06 | 0.93 | 0.56 | 0.46 |
| Score C | 39.34 | 24.46 | 17.88 | 36.11 |
| Score D | 47.08 | 73.37 | 81.01 | 62.96 |

QUALITY ESTIMATION DEVICE, QUALITY ESTIMATION METHOD, AND QUALITY ESTIMATION PROGRAM

CROSS-REFERENCE TO RELATED APPLICATIONS

This application claims the benefit of Japanese Patent Application No. 2018-179773 filed Sep. 26, 2018.

FIELD

The present disclosure relates to a quality estimation device, a quality estimation method, and a quality estimation program.

BACKGROUND

On the typical production line, the quality of a product assigned to a worker is assessed after the product is manufactured. Therefore, this requires that all completed products be inspected for quality assurance since the quality of the product is unknown until its production is complete. However, a total inspection incurs cost. Consequently, one technique considered is to estimate the quality of the product and to inspect the product in question if it is estimated that a defect may be present. It is thus possible to guarantee the quality of a product while reducing the number of products that are inspected for quality; and therefore it is possible to minimize the costs associated with inspection. JP 2006-073014A (Japanese Patent Publication No. 2006-073014) proposes a method of estimating the quality on the basis defect factor elements that are classified into various categories pertaining to the worker, the machinery, the manufacturing method, and the work environment. The quality may be, for instance, a work defect rate or the like for a product being made.

Technical Problem

The method proposed in JP 2006-073014A may be used to establish defect factor elements which, when established appropriately, make it possible to estimate the quality of a product being made on the production line. However, the divergence among the defect factor elements means that it takes time to collect information pertaining to the defect factor elements, and makes it difficult to suitably establish the defect factor elements. Therefore, methods such as those proposed in JP 2006-073014A lack the means for simply and appropriately estimating the quality of a product being made on the production line.

Given the foregoing circumstances, one or more aspects provide a technique for simply and appropriately estimating the quality of a product being made on the production line.

SUMMARY

To address the above-described disadvantages, one or more embodiments are configured as follows.

A quality estimation device according to one or more aspects includes: a first acquisition unit configured to acquire first information pertaining to the positioning of a worker executing a work step included in a process for manufacturing a product on a production line; a second acquisition unit configured to acquire second information pertaining to the usage condition of a tool the worker uses in the work step; an estimation unit configured to estimate the quality of a product being made through the work step according to the degree to which the positioning of the worker and the usage condition of the tool represented by the first information and the second information acquired conforms to a predetermined first standard and a predetermined second standard; and an output unit configured to output information pertaining to the result of estimating the quality of the product.

Through experimentation (later described), the inventors discovered that the quality of a product being made is dependent on both the positioning of a worker and the usage condition of a tool used. In other words, the inventors discovered that the better a worker's positioning and the usage condition of a tool, the higher the probability that the product being made was of good quality; and conversely, the worse the worker's positioning and the usage condition of the tool, the higher the probability that the product being made was of bad quality. A quality estimation device according to one or more aspects is configured to estimate the quality of a product being made on the production line based on the above knowledge. That is, a quality estimation device, thus configured, estimates the quality of a product being made through a work step according to the degree to which the worker's positioning conforms to a predetermined first standard, and a degree to which the usage condition of the tool conforms to a predetermined second standard. Hereby, the quality estimation device with the aforementioned configuration can simply and appropriately estimate the quality of a product being made on the production line from as little as two types of information: the positioning of the worker and the usage condition of the tool.

The first standard is established to assess whether the positioning of the worker is acceptable or unacceptable (appropriate) in relation to the quality of the product being made. The positioning of the worker may be assessed on the basis of the state of at least one portion of the worker's body. One or a plurality of metrics may be used to assess the positioning of the worker: e.g., the position of a body part; the orientation (angle) of a body part; the positional relationship between a plurality of body parts; the positional relationship between a work piece that as acted upon and a body part; a combination of these metrics may also be used. The position of a body part may be the position of the head, torso, arm, hand, or the like. The orientation of a body part may be the orientation of the head, torso, arm, hand, or the like. The positional relationship between body parts may be derived from the distance, or the like, between the head and the hand. The positional relationship between a work piece and a body part may be derived from the distance, or the like, between the worker's head and the work piece. A body part may include an object the worker puts on, such as glasses, clothing, or the like.

In contrast, the second standard is established to assess whether the usage condition of a tool is acceptable or unacceptable (appropriate) in relation to the quality of the product being made. The usage condition of a tool may be assessed on the basis of a physical condition of the tool when the tool is operated. One or a plurality of metrics may be used to assess the usage condition of a tool: e.g., the position of the tool relative to the worker; the position of the tool relative to the work piece; the tilt of the tool; a combination of these metrics may also be used. The position of the tool relative to the worker may be derived from the distance, or the like, between the position of a body part of the worker and the tool. The position of the tool relative to a work piece may be derived from the distance between a work area for the work piece and the position or the like of the tool in a workspace. The tilt of the tool may be derived from the angle of the tool relative to the worker's hand, and the angle or the like of the tool relative to the work piece.

The positioning of the worker and the usage condition of the tool may each be measured as appropriate via one or a plurality of sensors. The one or plurality of sensors may be a camera, motion capture system, or a combination thereof. The camera may be a typical RBG imaging camera; a depth camera (e.g., a distance or stereo camera) capable of acquiring a depth image; a thermographic camera (e.g., infra-red camera) capable of acquiring a thermographic image; or the like. The degree to which the positioning of the worker and the usage condition of the tool each conform to a given standard may be represented by two levels of acceptable or unacceptable, or may be represented by three or more levels; each standard may be defined by one or a plurality of thresholds. The dimensions of a threshold may be established as appropriate in accordance with the number of metrics used for determining the positioning of the worker and the usage condition of the tool. The one or plurality of thresholds may be an upper limit threshold, a lower limit threshold, or a combination of these in a numerical range. In this case, the numerical range of the one or plurality of thresholds can be established in accordance with the levels representing the degree of conformity to the standards defined for each of the positioning of the worker and the usage condition of the tool. Hereby, the positioning of the worker and the usage condition of tool are each compared to one or a plurality of thresholds to identify the numerical range to which the same belong; this makes it possible to determine the degree to which the positioning of the worker and the usage condition of tool conforms to a standard.

In a quality estimation device according to one or more aspects, the positioning of the worker may be derived from the positional relationship between the head of the worker and the hand of the worker holding the tool. Additionally, the condition of the tool may include at least any of the position of the tool relative to the worker; the position of the tool relative to the work piece subject to the work step; and the tilt of the tool. The tilt of the tool may be derived from the angle of the tool relative to the hand of the worker holding the tool. The aforementioned configuration makes it possible to simply and appropriately predict the quality of a product being made on a production line.

In the quality estimation device according to one or more aspects, a work step may include soldering, fastening, applying a hot melt adhesive, or welding. The tool may be a soldering iron, a screwdriver, a glue gun, or a welding rod. The aforementioned configuration makes it possible to simply and appropriately estimate the quality of soldering, fastening, applying a hot melt adhesive, or welding.

In the quality estimation device according to one or more aspects, at least any of the first standard and the second standard may be established in accordance with an attribute of the worker. The aforementioned configuration makes it possible to more appropriately predict the quality of a product being made on a production line. An attribute need not be specifically limited as long as the attribute pertains to a characteristic of the worker, and can be selected as appropriate in accordance with the form of implementation. An "attribute" of a worker may be, for instance, the sex, physical feature, work performance (e.g., production output) or a combination of these.

A physical feature may be, for example, the dominant hand, dominant eye, height, shoulder width, length of the arm, or a combination of these.

As another implementation of the quality estimation device of one or more embodiments, one or more aspects may be an information processing method or a program that implements the above configuration, or a computer readable recording medium that stores such a program. The computer readable recording medium may be a medium whereon the information for the program or the like is accumulated via electrical, magnetic, optical, mechanical, or chemical processes so that a computer, another device, or a machine is capable of reading the information recorded in the program or the like.

A quality estimation method according to one or more aspects may cause a computer to execute steps including: acquiring first information pertaining to the positioning of a worker executing a work step included in a process for manufacturing a product on a production line; acquiring second information pertaining to the usage condition of a tool the worker uses in the aforementioned work step; estimating the quality of a product being made through the work step according to the degree to which the positioning of the worker and the usage condition of the tool represented by the first information and the second information acquired conforms to a predetermined first standard and a predetermined second standard; and output of information pertaining to the result of estimating the quality of the product.

Additionally, a quality estimation program according to one or more aspects may cause a computer to execute steps including: acquiring first information pertaining to the positioning of a worker executing a work step included in a process for manufacturing a product on a production line; acquiring second information pertaining to the usage condition of a tool the worker uses in the aforementioned work step; estimating the quality of a product being made through the work step according to the degree to which the positioning of the worker and the usage condition of the tool represented by the first information and the second information acquired conforms to a predetermined first standard and a predetermined second standard; and output of information pertaining to the result of estimating the quality of the product.

Effects

One or more aspects make it possible to simply and appropriately predict the quality of a product being made on a production line.

DETAILED DESCRIPTION

An embodiment according to one or more aspects (or, "one or more embodiments") is described below on the basis of the drawings. However, at all points the embodiments described below are merely examples of the invention. It goes without saying that various modifications and variations are possible without departing from the scope of the invention. That is, specific configurations may be adopted as appropriate in accordance with one or more embodiments when implementing the invention. Note that the data that appears in one or more embodiments is described in natural language; however, these descriptions point to virtual languages, commands, parameters, machine language and the like that may be recognized by a computer.

1. Example Application

Figure 1:
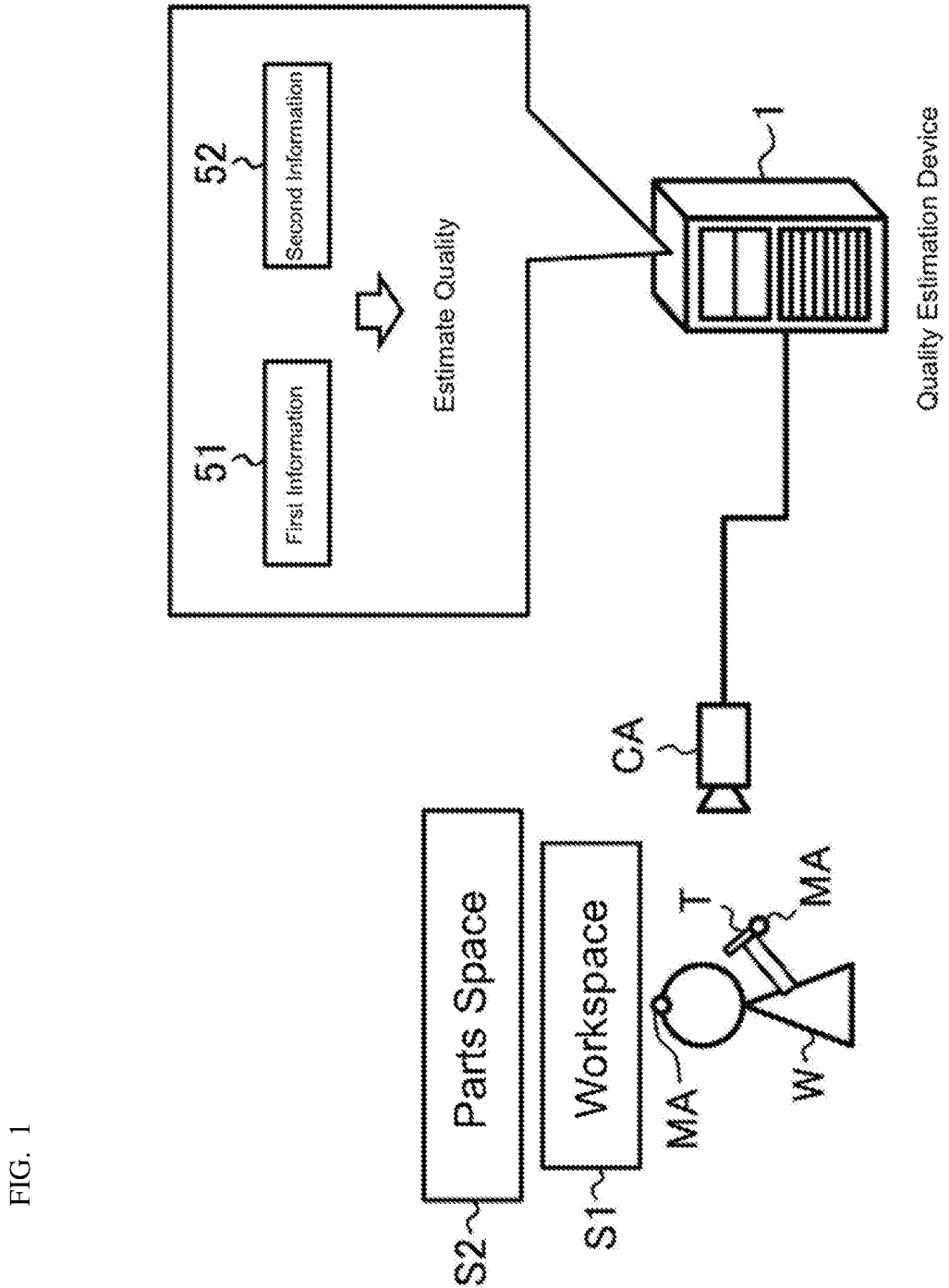
FIG. 1 is a diagram schematically illustrating an example of a setting where one or more aspects may be adopted.

First, an example of where one or more aspects may be adopted is described using FIG. 1. FIG. 1 schematically illustrates an example of where a quality estimation device 1 according to one or more embodiments may be adopted.

A worker W executes work steps included in a process on a production line for manufacturing a product. In the example illustrated in FIG. 1, a worker W acquires one or a plurality of parts making up a product from a parts space S2; the worker lays out the one or plurality of parts acquired in a workspace S1 to serve as the work piece. The worker W takes a tool T in hand and uses the tool to perform a work step on the work piece laid out in the workspace S1. However, the format through which the worker W executes the work step is not particularly limited to this example; the worker may execute the work step as appropriate in accordance with the form of implementation.

The quality estimation device 1 according to one or more embodiments is a computer configured to estimate the quality of a product being made when the worker W executes the above kind of work step. More specifically, the quality estimation device 1 according to one or more embodiments acquires first information 51 pertaining to the positioning of the worker W. The quality estimation device 1 also acquires second information 52 pertaining to the usage condition of a tool T the worker W uses for the work step.

The positioning of the worker W may be assessed on the basis of the state of at least one portion of body of the worker W. One or a plurality of metrics may be used to assess the positioning of the worker W: e.g., the position of a body part; the orientation (angle) of a body part; the positional relationship between a plurality of body parts; the positional relationship between a work piece that as acted upon and a body part; a combination of these metrics may also be used. The position of a body part may be the position of the head, torso, arm, hand, or the like. The orientation of a body part may be the orientation of the head, torso, arm, hand, or the like. The positional relationship between body parts may be derived from the distance, or the like, between the head and the hand. The positional relationship between a work piece and a body part may be derived from the distance, or the like, between the worker's head and the work piece (or the workspace S1). A body part may include an object the worker W puts on, such as glasses, clothing, or the like.

The usage condition of a tool T may be assessed on the basis of a physical condition of the tool T when the tool is operated. One or a plurality of metrics may be used to assess the usage condition of a tool T: e.g., the position of the tool T relative to the worker W; the position of the tool T relative to the work piece; the tilt of the tool T; or a combination of these metrics. The position of the tool T relative to the worker W may be derived from the distance, or the like, between the position of a body part of the worker W and the tool T. The position of the tool T relative to a work piece may be derived from the distance between the working area for the work piece and the position or the like of the tool T in a workspace S1. The tilt of the tool T may be derived from the angle of the tool T relative to the worker's hand, and the angle, or the like of the tool T relative to the work piece.

The positioning of the worker W and the usage condition of the tool T may each be measured as appropriate via one or a plurality of sensors. In one or more embodiments, the positioning of the worker W and the usage condition of the tool T is measured through optical motion capture implemented with a plurality of markers MA and cameras CA. Each of the markers may be installed on a worker's body part (e.g., the head or hand), and at predetermined locations on the tool (e.g., the tip end, or the like). The quality estimation device 1 acquires the first information 51 and the second information 52 obtained through this motion capture.

Next, the quality estimation device 1 according to one or more embodiments estimates the quality of a product being made through a work step according to the degree to which the positioning of the worker W and the usage condition of the tool T represented by the first information 51 and the second information 52 acquired conforms to a predetermined first standard and a predetermined second standard. The quality estimation device 1 outputs information pertaining to the results of estimating the quality of a product. Hereby, the quality estimation device of one or more embodiments can simply and appropriately estimate the quality of a product being made on the production line from as little as two types of information: the positioning of the worker W and the usage condition of the tool T.

The types of products made are not particularly limited and may be selected as appropriate in accordance with the form of implementation. A product may be, for instance, and electronic component, an automotive part, a drug, or a food product. The electronic component may be a chip capacitor, a liquid crystal, or a relay coil; the automotive part may be a connecting rod, a shaft, an engine block, a power window switch, a panel, or the like. However, the type of work steps the worker W performs is not particularly limited as long as a tool is used, and the type of work step may be selected as appropriate in accordance with the form of implementation. The work steps the worker W performs may be soldering, fastening, applying a hot melt adhesive, or welding. The types of tools T are not particularly limited, and as long as the tool is used for a work step the tool may be selected as appropriate in accordance with the form of implementation. The tool T may be a soldering iron, a screwdriver, a glue gun, or a welding rod.

2. Example Configuration

Hardware Configuration

Figure 2:
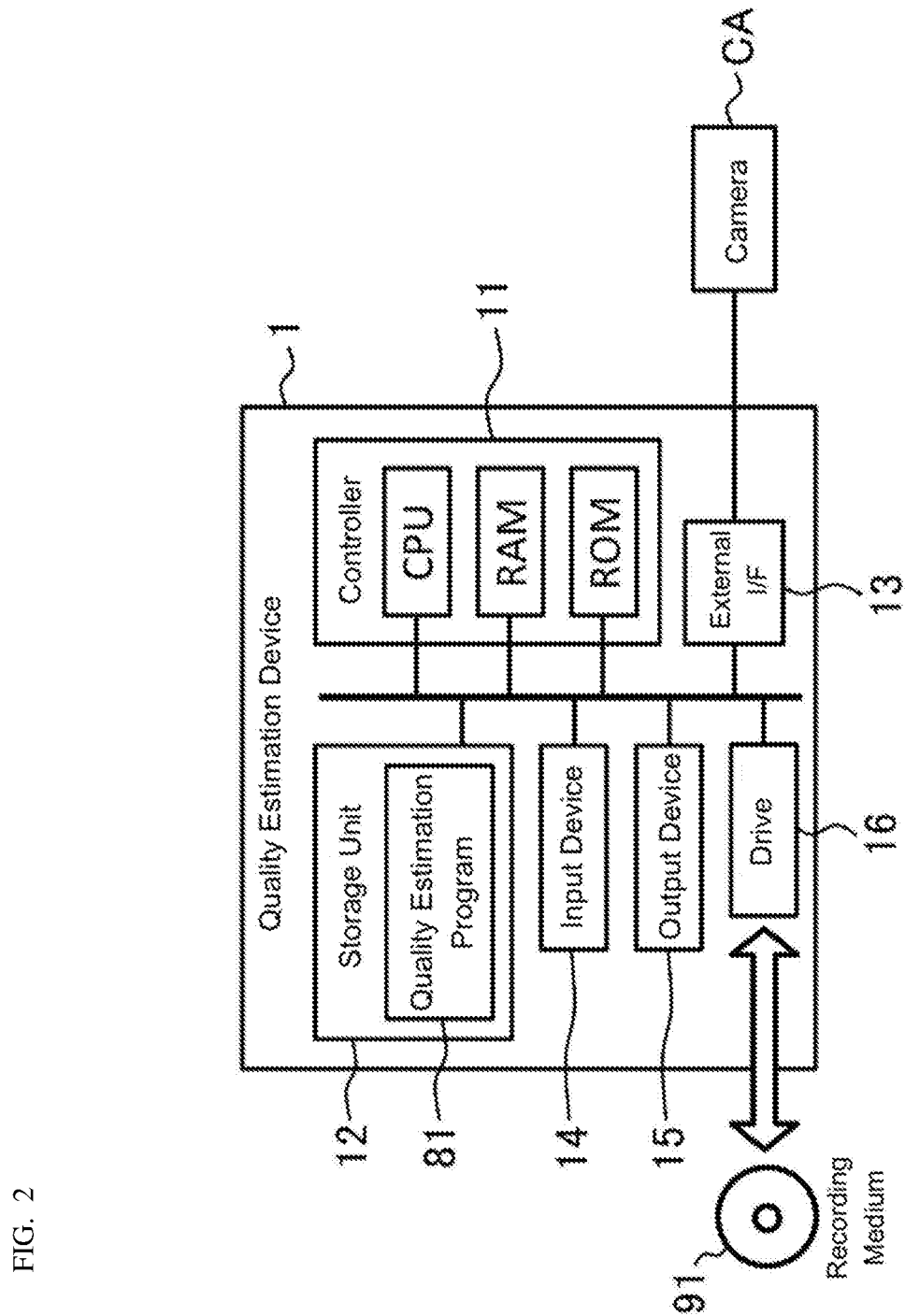
FIG. 2 is a diagram schematically illustrating an example of a hardware configuration for a quality estimation device according to one or more embodiments.

Next an example of the hardware configuration for the quality estimation device 1 according to one or more embodiments is described using FIG. 2. FIG. 2 schematically illustrates an example of a hardware configuration for a quality estimation device 1 according to one or more embodiments.

As illustrated in FIG. 2, the quality estimation device 1 according to one or more embodiments is a computer with a controller 11, a storage unit 12, an external interface 13, an input device 14, an output device 15, and a drive 16 electrically connected thereto. Note that in FIG. 2 the external interface is noted as an "external I/F".

The controller 11 includes a central processing unit (CPU) which is a hardware processor, random access memory (RAM), and read only memory (ROM), or the like; the controller 11 is configured to process information on the basis of a program and various kinds of data. The storage unit 12 is one example of memory and, for example, may be constituted by a hard drive or a solid-state drive or the like. The storage unit 12 in one or more embodiments stores various kinds of information, such as a quality estimation program 81, and the like. The quality estimation program 81 causes the quality estimation device 1 to perform later-described information processing (FIG. 4) pertaining to estimating the quality of a product being made through a worker W executing work steps. The quality estimation program 81 includes a series of commands for processing information. The details are described later.

The external interface 13 may be a universal serial bus (USB) port, or a dedicated port, or the like, and is for connection to an external device. The types and number of the external interface 13 may be selected as appropriate in accordance with the types and number of external devices for connection. In one or more embodiments the quality estimation device 1 is connected to a camera CA through the external interface 13 with the camera CA as part of the motion capture system. The quality estimation device 1 is thus able to acquire the first information 51 and the second information 52 obtained from measurements taken via motion capture.

The input device 14 may be a mouse, keyboard, or the like for input. The output device 15 may be a display, speaker, or the like for output. An operator uses the input device 14 and the output device 15 to operate the quality estimation device 1. The operator may be a supervisor that controls the conditions on the production line.

The drive 16 may be a compact disk drive (CD), a DVD drive, or the like; the drive 16 is for reading a program stored on a recording medium 91. The type of drive 16 may be selected as appropriate in accordance with the type of recording medium 91. The above-mentioned quality estimation program 81 may be stored on such a recording medium 91.

The recording medium 91 may be a medium whereon the information for the program or the like is accumulated via electrical, magnetic, optical, mechanical, or chemical processes so that a computer, another device, or a machine can read the information stored in the program or the like. The quality estimation device 1 may obtain the quality estimation program 81 from the recording medium 91.

FIG. 2 illustrates a CD, or DVD-type recording medium as one example of the recording medium 91. However, this does not mean that the type of recording medium 91 is particularly limited to a disc; the recording medium may be of another format. For instance, flash memory and semiconductor memory are examples of this non-disc recording medium.

The constituent elements of the specific hardware configuration of the quality estimation device 1 may be omitted, substituted, or added to as appropriate in accordance with one or more embodiments of the quality estimation device 1. For instance, the controller 11 may contain a plurality of hardware processors. A hardware processor may be configured from a microprocessor, a field-programmable gate array (FPGA), or the like. The storage unit 12 may be configured from the RAM and ROM included in the controller 11. Any one of the external interface 13, input device 14, output device 15, and drive 16 may be omitted. The quality estimation device 1 may include a communication interface that connects to an external device via a network to provide data communication therewith. The quality estimation device 1 may be made up of a plurality of computers. In this case, the hardware configuration of the computers may be identical or may be different. The quality estimation device 1 may be an information processing device designed exclusively for providing a service; beyond this the quality estimation device 1 may be a general purpose server device, a personal computer (PC) or the like.

Software Configuration

Figure 3:
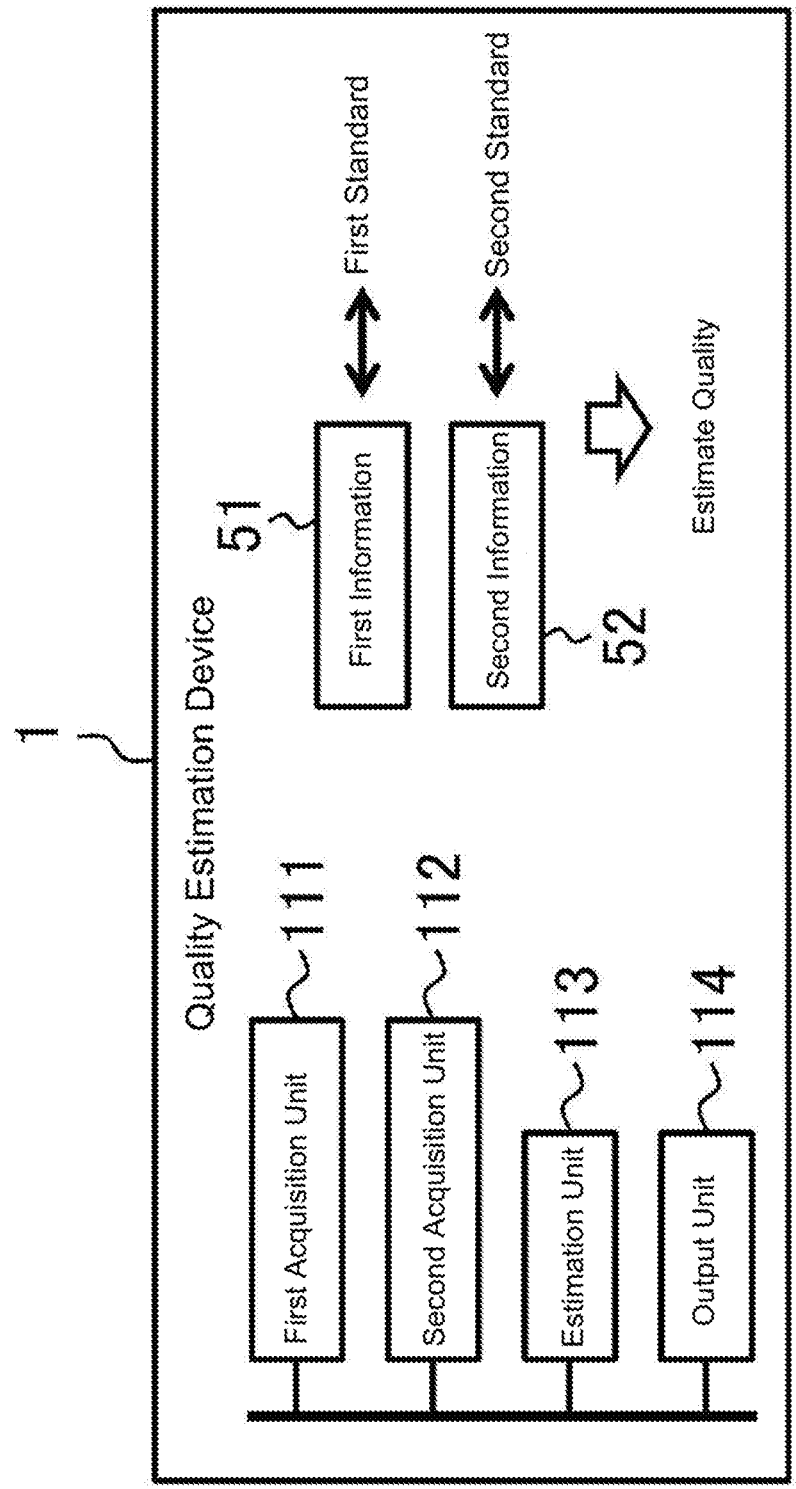
FIG. 3 is a diagram schematically illustrating an example of a software configuration for a quality estimation device according to one or more embodiments.

Next an example of the software configuration for the quality estimation device 1 according to one or more embodiments is described using FIG. 3. FIG. 3 schematically illustrates an example of a software configuration for a quality estimation device according to one or more embodiments.

The controller 11 in the quality estimation device 1 expands the quality estimation program 81 stored in the storage unit 12 into RAM. The controller 11 then uses the CPU to compile and execute the quality estimation program 81 expanded to the RAM to control the constituent elements on the basis of a series of commands contained in the quality estimation program 81. Thereby, the quality estimation device 1 according to one or more embodiments operates as a computer equipped with software modules such as a first acquisition unit 111, a second acquisition unit 112, an estimation unit 113, and an output unit 114 as shown in FIG. 3. That is, the controller 11 (the CPU) implements one or more embodiments with the software modules.

The first acquisition unit 111 acquires first information pertaining to the positioning of a worker W executing a work step included in a process for manufacturing a product on a production line. The second acquisition unit 112 acquires second information 52 pertaining to the usage condition of a tool T the worker W uses for the work step. The estimation unit 113 estimates the quality of a product being made through a work step according to the degree to which the positioning of the worker W and the usage condition of the tool T represented by the first information 51 and the second information 52 acquired conforms to a predetermined first standard and a predetermined second standard. The output device 114 outputs information pertaining to the results of estimating the quality of a product.

The software modules in the quality estimation device 1 are described in detail below with an operation example. Note that all the software modules of the quality estimation device 1 described with one or more embodiments are examples that may be implemented with a general purpose CPU. However, all or a portion of the above software modules may also be implemented in one or a plurality of dedicated processors. The software in the quality estimation device 1 may be configured by omitting, substituting, or adding software modules as appropriate in accordance with the form of implementation.

3. Operation Example

Figure 4:
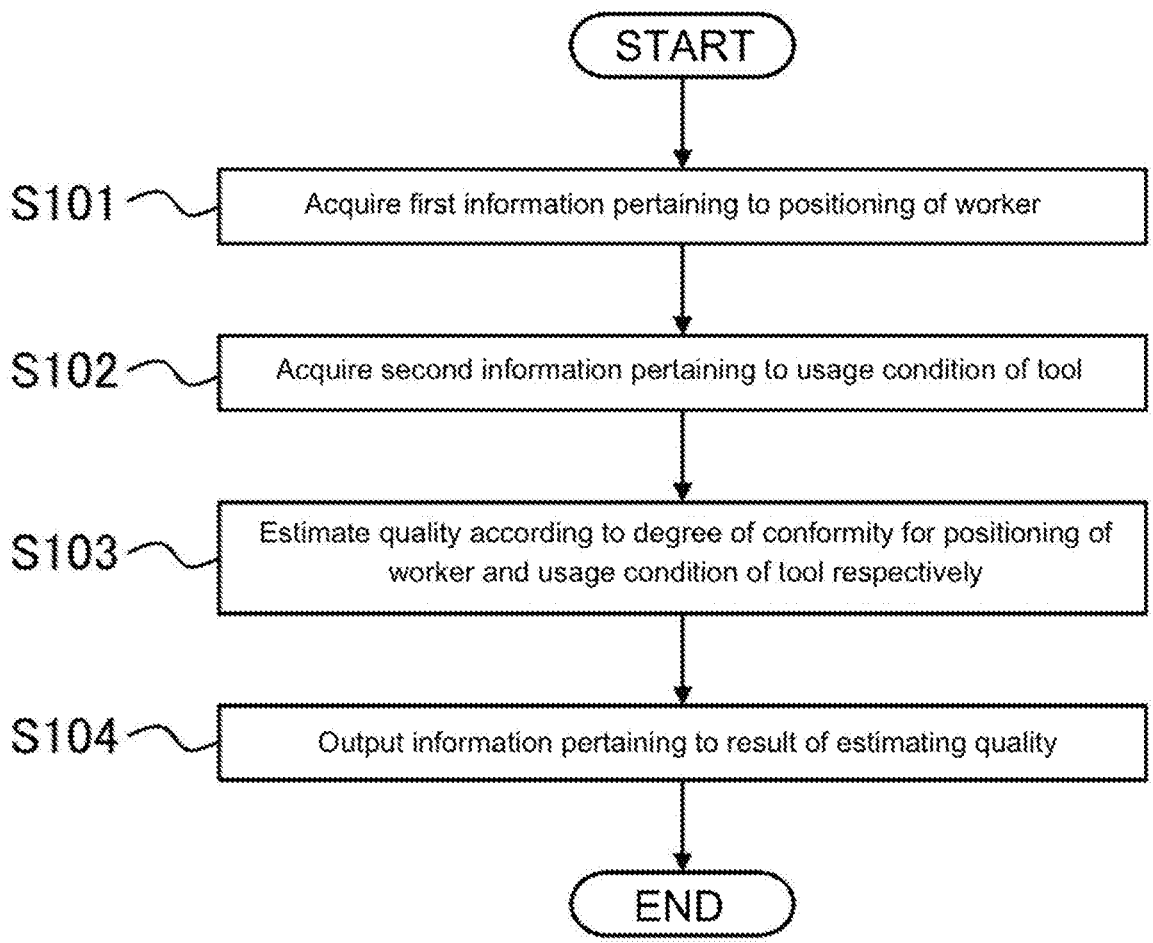
FIG. 4 is a diagram schematically illustrating an example of a processing sequence in a quality estimation device according to one or more embodiments.

Next an example operation of the quality estimation device 1 according to one or more embodiments is described using FIG. 4. FIG. 4 schematically illustrates an example of a processing sequence in the quality estimation device 1 according to one or more embodiments; the processing sequence described below is one example of a "quality estimation method" according to one or more embodiments. However, the processing sequence described below is merely one example and each processing step may be subject to change wherever possible. Further, the processing sequence described below may allow the omission, replacement, and addition of steps as appropriate in accordance with the form of implementation.

Step S101 and S102

In step S101, the controller 11 operates as the first acquisition unit 111 and acquires first information 51 pertaining to the positioning of the worker W. In step S102, the controller 11 operates as the second acquisition unit 112 and acquires second information 52 pertaining to the usage condition of a tool T the worker W uses for the work step.

The positioning of the worker W and the usage condition of the tool T may each be measured as appropriate via one or a plurality of sensors. As above described, the positioning of the worker may be assessed via assessing the position of a body part; the orientation (angle) of a body part; the positional relationship between a plurality of body parts; the positional relationship between a work piece that as acted upon and a body part; or a combination of these metrics. The usage condition of a tool T may also be assessed by assessing the position of the tool T relative to the worker W; the position of the tool T relative to the work piece; the tilt of the tool T; or a combination of these metrics.

In one or more embodiments, assessing the positioning of the worker W includes assessing the positional relationship of a plurality of body parts. More specifically, the positioning of the worker W can be derived from the positional relationship between the head of the worker W and the hand of the worker W holding the tool T. The usage condition of a tool T may include assessing any of the position of the tool T relative to the worker W; the position of the tool T relative to the work piece; and the tilt of the tool T. The position of the tool T relative to the worker W may be derived the positional relationship between the head of the worker W and the tool T. The position of the tool T relative to the work may be derived from the position [location] of the tool T in the workspace S1. The tilt of the tool T may be derived from the angle of the tool T relative to the worker's hand that is holding the tool. In one or more embodiments, the controller 11 uses motion capture to acquire the measurements and thereby derive the positioning of the worker W and the usage condition of the tool T.

As a concrete example, assume markers are attached to the head, right hand, and left hand of the worker W, and to the tip of the tool T. The camera CA is appropriately configured to track the position of the markers while the worker W executes a work step. Note that the number, location, and type of cameras CA may be determined as appropriate in accordance with the form of implementation. The camera CA captures an image while the worker W executes a work step, and the controller 11 acquires the image captured. The image captured may be video or a still image. The controller 11 detects markers MA from within the image and computes the location of the markers in real space on the basis of the detection result. For example, known image processing techniques such as pattern matching may be used in this series of processes. The controller 11 derives the positioning of the worker W and the usage condition of the tool T from the positional relationship of the markers MA.

The controller 11 may compute the distance between a marker MA attached to the head of the worker W and a marker MA attached to the hand of the worker W holding the tool T to thereby derive the positioning of the worker W. The controller 11 may also compute the distance between the marker MA attached to the head of the worker W and a marker MA attached to the tip of the tool T to thereby derive the position of the tool T relative to the worker W. The controller 11 may compute the position of the marker MA attached to the tip of the tool T in relation to the workspace S1 to thereby derive the position of the tool T relative to the work piece. The range of the workspace S1 may be established in advance, or may be identified by detection within an image captured by the camera CA. The controller 11 may compute the positional relationship between a marker attached to the hand of the worker W holding the tool T and the marker attached to the tip of the tool T to derive the angle of the tool T relative to the hand holding the tool, and to derive the tilt of the tool T.

Hereby, the controller 11 of one or more embodiments can acquire first information 51 representing the positioning of the worker W from the distance between the head of the worker W and the hand of the worker W holding the tool T. The controller 11 can also acquire second information 52 representing the usage condition of the tool T from at least one of: the distance between the head of the worker and the tool T, the position of the tool T in the workspace S1, and the angle of the tool T relative to the hand holding the tool T. Once the controller 11 acquires the first information 51 and the second information 52, the controller 11 continues to the next step S103.

The order in which the first information 51 and the second information 52 are acquired, i.e., the order in which step S101 and S102 are executed is not particularly limited; the order may be determined as appropriate according to the implementation. Additionally, the method of acquiring the first information 51 and the second information 52 is not particularly limited to this example and may be selected as appropriate in accordance with the form of implementation. The above mentioned process for deriving the positioning of the worker W and the usage condition of the tool T may be executed on a different computer besides the quality estimation device 1. In this case, the controller 11 may acquire the results computed by the other computer via the network or the like, to thereby acquire the first information 51 and the second information 52.

Step S103

In step S103, the controller 11 operates as the estimation unit 113 to estimate the quality of a product being made through a work step; the controller 11 estimates the quality of the product according to the degree to which the positioning of the worker W and the usage condition of the tool T represented by the first information 51 and the second information 52 acquired conforms to a predetermined first standard and a predetermined second standard.

The first standard is established to assess whether the positioning of the worker is acceptable or unacceptable in relation to the quality of the product being made. The second standard is established to assess whether the usage condition of a tool is acceptable or unacceptable in relation to the quality of the product being made. The degree to which the positioning of the worker W and the usage condition of the tool T each conform to a given standard may be represented by two levels of acceptable or unacceptable, or may be represented by three or more levels. The first standard and the second standard may be established respectively as appropriate in accordance with the how the degree of conformity is represented and the metrics used for each of the standards. Each standard may be defined by one or a plurality of thresholds. The one or plurality of thresholds may be an upper limit threshold, a lower limit threshold, or a combination of these in a numerical range. In this case, the numerical range of the one or plurality of thresholds can be established in accordance with the levels representing the degree of conformity to the standards defined for each of the positioning of the worker W and the usage condition of the tool T. Hereby, the positioning of the worker W and the usage condition of tool T are each compared to one or a plurality of thresholds to identify the numerical range to which the positioning of the worker W and the usage condition of tool T belong, and therefore makes it possible to determine the degree to which the positioning of the worker W and the usage condition of tool T conforms to a standard.

The better the assessment of the positioning of the worker W and the usage condition of the tool T on the basis of the first information and the second information, the higher the probability that the controller 11 estimates the quality of the product being made as good quality. On the other hand, the worse the assessment of the positioning of the worker W and the usage condition of the tool on the basis of the first information and the second information, the higher the probability that the controller 11 estimates the quality of the product being made as bad quality. The quality of a product may be expressed with two scores (e.g., good or bad), or may be expressed with three or more scores.

More specifically, the following was discovered from the results of experimentation. That is, the distance between the head and the hand gripping a tool, and the angle of the tool relative to the hand holding the tool was measured while a skilled operator and a beginner operator performed a soldering operation. Consequently, the distance for the skilled operator was 15 cm to 20 cm, while for the beginner the distance was 10 cm to 15 cm in most cases. The angle of the tool was 45 degrees or less for the skilled operator, while for the beginner the angle of the tool was 45 degrees or more. That is, the trend observed was that the longer the distance between the head and the hand holding the tool, and the smaller the angle of the tool relative to the hand holding the tool, the better the quality of the soldering operation; on the other hand, the shorter the distance between the head and the hand holding the tool and the larger the angle of the tool relative to the hand holding the tool, the worse the quality of the soldering.

Therefore, the first standard in one or more embodiments may be defined from a threshold established for determining whether the distance between the head of the worker W and the hand of the worker holding the tool T is acceptable or unacceptable. The second standard may be similarly defined from a threshold established for determining whether the angle of the tool relative to the hand holding the tool T is acceptable or unacceptable.

In this case, the controller 11 can compare the first information 51, which represents the distance between the head of the worker W and the hand of the worker holding the tool T, with a threshold for the first standard to determine whether the positioning of the worker W is acceptable or unacceptable. For example, the controller 11 may determine that the positioning of the worker W is acceptable when the distance represented by the first information 51 is greater than or equal to a given threshold, while determining that the positioning of the worker W is unacceptable when the distance represented by the first information 51 is less than the threshold.

The controller 11 can also compare the second information 52, which represents the angle of the tool relative to the hand holding the tool, with a threshold for the second standard to determine whether the usage condition of the tool T is acceptable or unacceptable. For example, the controller may determine that the usage condition of the tool T is acceptable when the angle represented by the second information 52 is greater than or equal to a given threshold, while determining that the usage condition of the tool T is unacceptable when the angle represented by the second information 52 exceeds the threshold.

Thus, the degree to which the positioning of the worker W and the usage condition of the tool T conforms to a standard may be categorized in a first class when both parameters are acceptable; in a second class when the positioning of the worker W is acceptable but the usage condition of the tool is unacceptable; in a third class when the positioning of the worker W is unacceptable but the usage condition of the tool T is acceptable; and in a fourth class when both the positioning and the usage condition are unacceptable. The number of categories for the quality of a product may match the number of classes, or may be different from the number of classes. The controller 11 is capable of estimating the quality of the product in accordance with each of the classes.

The quality of a product may, for example, be expressed by two scores. Here, the first class may be mapped to a score indicating good quality, while the fourth class may be mapped to a score indicating bad quality. The second and third classes may be mapped to scores indicating good quality or may be mapped to scores indicating bad quality.

The quality of a product may also be expressed by three scores, for instance. Here, the first class may be mapped to a score indicating the best quality, while the fourth class may be mapped to a score indicating the worst quality. Any one of the second and third classes may be mapped to a middle score. The other of the second and third classes may be mapped to any of the three scores.

The quality of a product may also be expressed by four scores, for instance. Here, the first class may be mapped to a score indicating the best quality, while the fourth class may be mapped to a score indicating the worst quality. Any one of the second and third classes may be mapped to a score indicating the second best quality, while the other class may be mapped to a score indicating the third best quality.

The controller 11 is thus capable of estimating the quality of the product in accordance with each of the classes. After estimating the quality of the product being made, the controller 11 continues to the processing in the next step S104.

Step S104

In step S104 the controller 11 operates as the output unit 114 to output information pertaining to the results of estimating the quality of the product being made. However, the particulars of the output process are not limited to this example and may be determined as appropriate in accordance with the form of implementation.

The controller 11 may output the results of estimating the quality of the product being made on an output device 15 as the processing in step S104. If the controller 11 estimates that the product is of bad quality, the controller 11 may output a message on the output device 15 to prompt an inspection of the product. The worker W and the supervisor may thus be notified that the product being made is estimated to be of bad quality.

The destination for outputting information is not particularly limited to the output device 15 and may be selected as appropriate in accordance with the form of implementation. The destination for output of information may be an output device (e.g., display, speaker, indicator) such as a user terminal carried by the worker W or the supervisor, a display located near the worker W or supervisor, or the like. If the controller 11 estimates that the product is of bad quality, the controller 11 may output a message prompting the worker W to practice the work step, in addition to or instead of the above-described message. It is thus possible to implement improvement of the production line.

The controller 11 may also generate quality information indicating the results of estimating the quality of a product, and add the quality information to product information created to represent an attribute of the product being made as a part of the process in step S104. The composition of the product information may be selected as appropriate in accordance with the form of implementation. For example, the product information may contain information such as a product lot number, the manufacture date, and information pertaining to the worker W involved in the production (e.g., name, identification number, and the like).

The origin for creation and the destination for storing the product information are not particularly limited and may be selected as appropriate in accordance with the form of implementation. The quality estimation device 1 or another computer may create the product information. The destination for storing the product information may be the internal RAM of the controller 11, the storage unit 12, an external storage device, storage media, or a combination of these. The storage media may be a CD, a DVD or the like. The external storage device may be a data server such as network attached storage (NAS), or an externally installed storage device connected via the external interface 13.

In this case, it is possible to reference the quality information assigned to the product information to acquire the results of estimating the quality of a product on the basis of the first information 51 and the second information 52 obtained during the process of manufacturing the product. The estimation results indicated by the quality information may be used to guarantee the quality of the product as well as to narrow the scope of products for inspection. For example, a product estimated to have a quality that is at or below a predetermined score may be designated for inspection, while a product estimated to have a quality that exceeds a predetermined score may be excluded from inspection. The number of products inspected for quality may be reduced compared to cases where all products are inspected while also guaranteeing the quality of the products made on the production line.

The quality estimation device 1 may be connected to a control device (not shown) that manages the operation of the production line. Here, the controller 11 may output information pertaining to the results of estimating the quality of a product to the control device as a control signal for intervening in the operation of the production line. As a specific example, the controller 11 may select the destination of a product transported via a belt conveyor in accordance with the results of estimating the quality of the product. Thus, a product estimated to have bad quality and a product estimated to have good quality may be transferred to different locations.

Once the information pertaining to the results of estimating the quality of the product is complete, the controller 11 terminates the processes according to this operational example.

The timing at which the series of processes in the above step S101 through S104 is executed is not particularly limited and may be determined as appropriate in accordance with the form of implementation. The controller 11 may use the results of estimating the quality of the product prior to the finishing the product, for instance, when the controller 11 is to intervene in the operation of the production line during step S104; in this case, the controller 11 may execute the series of processes in the above steps S101 through S104 between the worker W starting a work step and until the product is completed. When this is not the case, the controller 11 may execute the series of processes in the above steps S101 through S104 at any time.

The controller 11 may also execute the series of processes in the above steps S101 through S104 per worker W when a plurality of worker W are involved in finishing a product. It is thus possible to identify the location or work step associated with bad product quality. This makes it possible to narrow the number of locations that require quality inspection even when implementing inspection of all products, and also reduces the cost incurred from inspections.

Features

As above described, the quality estimation device 1 of one or more embodiments can simply and appropriately estimate the quality of a product being made on the production line from as little as two types of information: the positioning of the worker W and the usage condition of the tool T. Additionally, it is possible to guarantee the quality of a product while minimizing the cost associated with product inspection by using the results of estimating the quality of the product.

4. Modification Examples

While embodiments are described above in detail, all points in the previous description are merely examples of the present invention. It goes without saying that various modifications and variations are possible without departing from the scope of the invention. The following modification is possible for instance. Note that constituent elements that are identical to the constituent elements in the above described embodiments are given the same reference numerals and where appropriate, a description of features that are identical to the above embodiments are omitted. The following modifications may be combined as appropriate.

4.1

In one or more embodiments, the positioning of the worker W and the usage condition of the tool T is measured through optical motion capture. However, the type of motion capture is not limited to the use of optics and may be magnetic or mechanical-based. The types of sensors used for measuring the positioning of the worker W and the usage condition of the tool T is also not limited to a motion capture system. The positioning of the worker W and the usage condition of the tool T may be measured using a camera, a motion capture system, or through any combination of these. The camera may be a typical RBG imaging camera; a depth camera (e.g., a distance, or stereo camera) capable of acquiring a depth image; a thermographic camera (e.g., infra-red camera) capable of acquiring a thermographic image; or the like. The positioning of the worker W and the usage condition of the tool T may be measured using different sensors, and not only via shared sensors as described above.

4.2

In one or more embodiments, at least any of the first standard and the second standard may be established in accordance with an attribute of the worker W. That is, a plurality of standards may be established for at least any of the first standard and the second standard such that one of the standards may be selected in accordance with an attribute of the worker W.

In this case, the controller 11 may acquire attribute information as appropriate in the above step S103; here, attribute information represents an attribute of a worker W. The destination for storing the attribute information is not particularly limited and may be selected as appropriate in accordance with the form of implementation. The destination for storing the attribute information may be the internal RAM of the controller 11, the storage unit 12, an external storage device, storage media, or a combination of these. The attribute of a worker W is not particularly limited as long as the attribute pertains to a characteristic of the worker W; the attribute can be selected as appropriate in accordance with the form of implementation. The attribute of a worker W may be, for instance, the sex, physical feature, work performance (e.g., production output) or a combination of these. A physical feature may be, for example, the dominant hand, dominant eye, height, shoulder width, length of the arm, or a combination of these.

Given a plurality of standards established, the controller 11 may then reference the attribute information acquired to select the standard to be used to estimate the quality in accordance with the attribute of the worker W. The controller 11 uses the standard selected to determine whether the positioning of the worker W and the usage condition of the tool T is acceptable or unacceptable. Assume, for instance, that two first standards are established in accordance with the height of a worker W. In this case the controller 11 determines whether or not the height of the worker W is at or above a threshold. The controller 11 may select the first standard established for a taller worker on determining that the height of the worker W is at or above the threshold. Whereas, the controller 11 may select the other of the two first standards when the height of the worker is below the threshold. After selecting a first standard, the controller 11 uses the first standard selected to determine whether the positioning of the worker W is acceptable or unacceptable.

The controller 11 estimates the quality of a product being made in accordance with the results of the evaluation; in other words, the controller 11 estimates the quality in accordance with the degree to which the positioning of the worker W conforms to a predetermined first standard, and the degree to which the usage condition of the tool T conforms to a predetermined second standard. It is thus possible to appropriately assess at least any of the positioning of the worker W and the usage condition of the tool T in step S103 in accordance with an attribute of the worker W. Therefore, the modification example also allows for more appropriately estimating the quality of a product being made.

5. Experiment

Next, the particulars of the experiment used to confirm that is it is possible to estimate the quality of a product from the positioning of a worker W and the usage condition of the tool T is described. That is, the experiment involved 16 subjects who each perfumed a soldering operation. The attributes of the subjects were as follows.
Subject Attributes
  Subject Details:
  7 Skilled Operators (3 Men, 4 Women)
  9 Beginners (7 Men, 2 Women)
  Requirements as Skilled Operators:
  (1) Possessed Certification for Soldering Skills
  (2) 1 or more years of work experience
  Dominant Hand:
  All Right-handed In addition to measuring the time a subject took to solder the product, the positioning of the subject and usage condition of the tool (soldering iron) was measured using a commercial motion capture system. More specifically, markers were placed on the subject's head (glasses), back of the right hand, back of the left hand, and the tip of the back end of the tool. The position of each part was tracked as the subjects were soldering. The distance between the marker on the head and the marker on the back of the right hand that was holding the tool (below, the "distance between the head and the right hand") was computed to derive the positioning of the subjects. The positional relationship between the marker on the back of the right hand, which was holding the tool, and the marker at the tip of the tool was used to compute the angle of the tool (below, the "angle between the right hand and the tool") and thereby derive the usage condition of the tool for each of the subjects.

Each of the skilled operators were made to execute a trial soldering operation 10 times; with eight instances of measurement data, i.e., the data measured from the third to the tenth time selected for analysis. In contrast, each of the beginners were made to execute a trial soldering operation 11 times; with nine instances of measurement data, i.e., the data measured from the third to the eleventh time selected for analysis. Given that 12 instances of measurement data from a total of 137 instances of measurement data contained faults, those 12 instances were not analyzed; therefore, a total of 125 instances of measurement data were analyzed. A maximum of six products were made during each trial. Hereby, the 125 instances of measurement data provided 184 points of sample data for the skilled operators and 302 points of sample data for the beginners.

The following was discovered from analyzing the sample data from a certain skilled operator and sample data from a certain subject. That is, the distance between the head and the right hand, and the angle between the right hand and the tool was computed from each sample data for the skilled operator and the beginner. Consequently, the distance for the skilled operator was 15 cm to 20 cm, while for the beginner the distance was 10 cm to 15 cm in most cases. The angle of the tool was 45 degrees or less for the skilled operator, while for the beginner the angle of the tool was 45 degrees or more. The trend observed was that shorter the time taken for soldering in particular, the longer the distance between the head and the right hand, and the smaller the angle between the right hand and the tool. In contrast, the longer the time taken for soldering, the shorter the distance between the head and the right hand, and the larger the angle between the right hand and the tool.

Therefore, the threshold for the first standard was established as 14.02 cm, and the threshold for the second standard was established as 45.0 degrees. It was then determined whether the positioning of the subject and the usage condition of the tool was acceptable or unacceptable for each of the samples. That is, it was determined that the positioning of the subject for a sample was acceptable when the distance between the head and the right hand for the sample exceeded 14.02 cm. In contrast, it was determined that the positioning of the subject for a sample was unacceptable when the distance between the head and the right hand for the sample was less than or equal to 14.02 cm. It was also determined that the usage condition of the tool for a sample was unacceptable when the angle between the right hand and the tool exceeded 45.0 degrees for the sample. On the other hand, it was determined that the usage condition of the tool for a sample was acceptable when the angle between the right hand and the tool was less than or equal to 45.0 degrees for the sample. Thus, the degree to which the positioning of the worker W and the usage condition of the tool T conforms to a standard may be categorized in a first class when both parameters are unacceptable; in a second class when the positioning of the worker W is acceptable but the usage condition of the tool is unacceptable; in a third class when the positioning of the worker W is unacceptable but the usage condition of the tool T is acceptable; and in a fourth class when both the positioning and the usage condition are acceptable.

The quality of the soldering of each sample was further examined via image analysis. More specifically, the quality of the soldering was assessed with four marks on the basis of the amount of solder at 18 locations. When the amount of solder at each location was extremely low, the soldering was assessed as having the worst quality and assigned the score "A". When the amount of solder at each location was low, the soldering was assessed as having the second worst quality and assigned the score "B". When the amount of solder at each location was appropriate, the soldering was assessed as having a good quality and assigned the score "C". When the amount of solder at each location was more appropriate, the soldering was assessed as having a better quality and assigned the score "D".

Figures 5, 6:
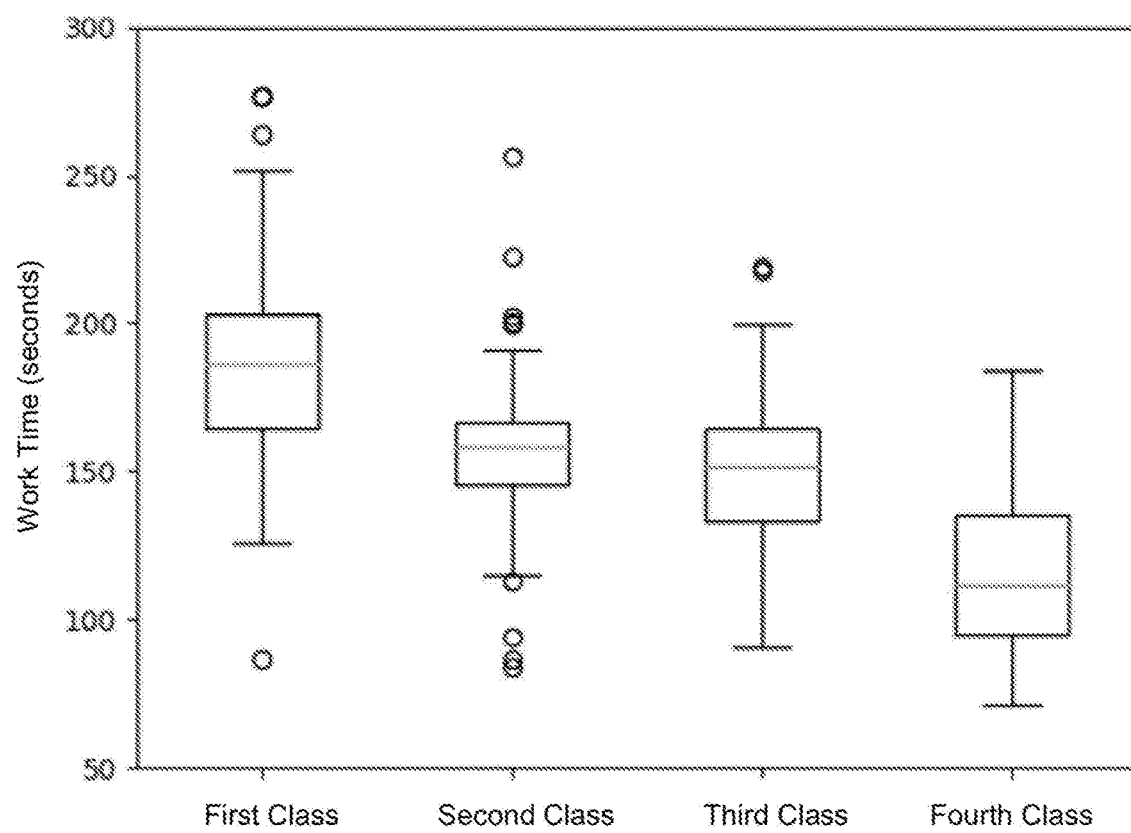
FIG. 5 is a diagram illustrating the results of assessing the quality of soldering for samples belonging to different classes.
FIG. 6 is a diagram illustrating the results of measuring the time taken to solder samples belonging to different classes.

FIG. 5 presents the results of assessing the quality of soldering for samples belonging to different classes; and FIG. 6 presents the results of measuring the time taken to solder samples belonging to different classes. As depicted in FIG. 5, in the first class soldering of bad quality had the highest occurrence rate of 13.58%. In the second class, soldering of bad quality had an occurrence rate of 2.16%. In the third class, soldering of bad quality had an occurrence rate of 1.02%. In the fourth class, soldering of bad quality had an occurrence rate of 0.92%. That is, it was understood that the quality of the soldering improved when the positioning of the worker and the usage condition of the tool improved. Further, as depicted in FIG. 6, in the first class, the amount of time take for soldering was the longest; in the second and third classes the time taken was about the same; and in the fourth class, the time taken was the shortest. That is, it was understood that the time taken for soldering improved when the positioning of the worker and the usage condition of the tool improved. Accordingly, it was understood from these results that the quality of a product being made is dependent on both the positioning of a worker and the usage condition of a tool being used. In other words, it was understood that it is possible to estimate the quality of a product from whether the positioning of a worker and the usage condition of a tool is acceptable or unacceptable.

REFERENCE NUMERALS

1 Quality estimation device
11 Controller
12 Storage unit
13 External interface
14 Input device
15 Output device
16 Drive
111 First acquisition unit
112 Second acquisition unit
113 Estimation unit
114 Output unit
51 First information
52 Second information
81 Quality estimation program
91 Recording medium
S1 Workspace
S2 Parts space
CA Camera
W Worker
T Tool

The invention claimed is:

1. A quality estimation device comprising a processor configured with a program to perform operations comprising:
    operation as a first acquisition unit configured to acquire first information pertaining to a positioning of a worker executing a work step included in a process for manufacturing a product on a production line;
    operation as a second acquisition unit configured to acquire second information pertaining to a usage condition of a tool the worker uses in the work step;
    operation as an estimation unit configured to estimate quality of a product being made through the work step according to a degree to which the positioning of the worker represented by the acquired first information conforms to a predetermined first standard comprising an upper threshold associated with a distance between a head of the worker and the tool and a lower threshold associated with the distance between the head of the worker and the tool, and a degree to which the usage condition of the tool represented by the acquired second information conforms to a predetermined second standard comprising an upper threshold associated with an angle of the tool relative to a hand of the worker holding the tool and a lower threshold associated with the angle of the tool relative to the hand of the worker holding the tool; and
    operation as an output unit configured to output information pertaining to a result of estimating the quality of the product.

2. The quality estimation device according to claim 1, wherein the positioning of the worker is derived from a positional relationship between the head of the worker and the hand of the worker holding the tool.

3. The quality estimation device according to claim 1, wherein: the usage condition of the tool comprises a position of the tool relative to the worker, a position of the tool relative to a work piece subject to the work step, and a tilt of the tool.

4. The quality estimation device according to claim 3, wherein:
    the tilt of the tool is derived from the angle of the tool relative to the hand of the worker holding the tool.

5. The quality estimation device according to claim 1, wherein:
    the work step comprises soldering, fastening, applying a hot melt adhesive, or welding; and
    the tool comprises a soldering iron, a screwdriver, a glue gun, or a welding rod.

6. The quality estimation device according to claim 1, wherein: at least one of the predetermined first standard and the predetermined second standard is established in accordance with an attribute of the worker.

7. The quality estimation device according to claim 2, wherein: the usage condition of the tool comprises a position of the tool relative to the worker, the position of the tool relative to a work piece subject to the work step, and a tilt of the tool.

8. The quality estimation device according to claim 7, wherein:
    the tilt of the tool is derived from the angle of the tool relative to the hand of the worker holding the tool.

9. The quality estimation device according to claim 2, wherein:
    the work step comprises soldering, fastening, applying a hot melt adhesive, or welding; and
    the tool comprises a soldering iron, a screwdriver, a glue gun, or a welding rod.

10. The quality estimation device according to claim 3, wherein:
the work step comprises soldering, fastening, applying a hot melt adhesive, or welding; and
the tool comprises a soldering iron, a screwdriver, a glue gun, or a welding rod.

11. The quality estimation device according to claim 4, wherein:
the work step comprises soldering, fastening, applying a hot melt adhesive, or welding; and
the tool comprises a soldering iron, a screwdriver, a glue gun, or a welding rod.

12. The quality estimation device according to claim 2, wherein: at least one of the predetermined first standard and the predetermined second standard is established in accordance with an attribute of the worker.

13. The quality estimation device according to claim 3, wherein: at least any one of the predetermined first standard and the predetermined second standard is established in accordance with an attribute of the worker.

14. The quality estimation device according to claim 4, wherein: at least any one of the predetermined first standard and the predetermined second standard is established in accordance with an attribute of the worker.

15. The quality estimation device according to claim 5, wherein: at least any one of the predetermined first standard and the predetermined second standard is established in accordance with an attribute of the worker.

16. A quality estimation method causing a computer to execute operations comprising:
acquiring first information pertaining to a positioning of a worker executing a work step included in a process for manufacturing a product on a production line;
acquiring second information pertaining to a usage condition of a tool the worker uses in the work step;
estimating quality of a product being made through the work step according to a degree to which the positioning of the worker represented by the acquired first information an upper threshold associated with a distance between a head of the worker and the tool and a lower threshold associated with the distance between the head of the worker and the tool, and a degree to which the usage condition of the tool represented by the acquired second information conforms to a predetermined second standard comprising an upper threshold associated with an angle of the tool relative to a hand of the worker holding the tool and a lower threshold associated with the angle of the tool relative to the hand of the worker holding the tool; and
outputting information pertaining to a result of estimating the quality of the product.

17. A non-transitory computer-readable storage medium storing a quality estimation program, which when read and executed, causes a computer to perform operations comprising:
acquiring first information pertaining to a positioning of a worker executing a work step included in a process for manufacturing a product on a production line;
acquiring second information pertaining to a usage condition of a tool the worker uses in the work step;
estimating quality of a product being made through the work step according to a degree to which the positioning of the worker represented by the acquired first information an upper threshold associated with a distance between a head of the worker and the tool and a lower threshold associated with the distance between the head of the worker and the tool, and a degree to which the usage condition of the tool represented by the acquired second information conforms to a predetermined second standard comprising an upper threshold associated with an angle of the tool relative to a hand of the worker holding the tool and a lower threshold associated with the angle of the tool relative to the hand of the worker holding the tooll; and
outputting information pertaining to a result of estimating the quality of the product.

* * * * *